SYSTEM OF ENCLOSURES AND CONNECTORS FOR MICROWAVE CIRCUITS

Filed July 17, 1967 3 Sheets-Sheet 1

United States Patent Office 3,480,887

Patented Nov. 25, 1969

3,480,887
SYSTEM OF ENCLOSURES AND CONNECTORS FOR MICROWAVE CIRCUITS

Arthur Uhlir, Jr., Weston, Mass., assignor to Microwave Associates, Inc., Burlington, Mass., a corporation of Massachusetts Filed July 17, 1967, Ser. No. 653,879
Int. Cl. H03h *5/00;* H01p *1/00*
U.S. Cl. 333—24 7 Claims

ABSTRACT OF THE DISCLOSURE

A system of enclosures for microwave circuits and means for interconnecting circuits mounted in these enclosures with each other or with microwave circuits or cables having conventional connectors is disclosed.

BACKGROUND OF THE INVENTION

The field of this invention is microwave circuit enclosures and means for interconnecting them. The invention is particularly applicable to miniaturized microwave circuits constructed in "microstrip" configuration using ceramic or semiconductor substrates.

FIGURE 1, shows, as an example, a relatively simple microstrip circuit, composed of an alumina ceramic substrate 1 with silver conductors bonded thereon. The interconnection of such microwave circuits can be carried out in various ways. One way is to perfect the design of each individual circuit and then to prepare the combination of circuits at one time on a single substrate. However, there are limits to the number of circuits that can be placed in one enclosure without mutual interference. In any particular circumstance, the largest permissible combination of circuits must be determined by trial.

Many applications of microwaves do not lead to the production of a large number of systems. It is therefore desirable to be able to combine separate enclosures, each containing a standardized combination of circuits less than the maximum permissible number.

Consider first that a circuit board like the example shown in FIGURE 1 is to be individually packaged. The present style of enclosure is shown in FIGURE 2. Here, a box with good electromagnetic shielding properties (e.g. a metallic conductive box) is made to accept the microstrip circuit board. Connectors are bolted to the outside of the box so that microwave signals may enter and leave by means of holes drilled in the box.

The consequences of the present techniques are shown in FIGURE 3, which illustrates an assembly of such enclosures. It will be noted that the connectors provide a relatively weak mechanical binding to the assembly. Even when the sexes of the connectors are approximately mated, the connector lengths add substantially to the dimensions of the assembly. If adapters are required to complete the connection, the added length is still more pronounced and mechanical rigidity is further sacrificed.

The disadvantages mentioned in connection with FIGURE 3 have been present in conventional packaging of microwave circuits. The advent of miniaturized microwave circuits makes the problem more severe because the mechanical rigidity decreases rapidly as size is reduced.

To overcome some of these objections pertaining to the minimization of the interaction between microwave circuits and the maximization of rigidity the standard box of FIGURE 2 has been subdivided into two or more compartments by metallic diaphragms having a small hole called a "rats hole" at the interface of the diaphragm and the circuit through which a connection may be effected with the adjacent compartment. Although this has the effect of overcoming some objections it introduces others. Circuits enclosed in a multiple compartment device must be predesigned individually to produce a combination of results such as switching, limiting, phase shifting, etc., of microwave energy. The user is not free to choose individual components from different manufacturers who may have superior proprietary products that perform only one function only, such as for example switching, limiting, phase shifting or mixing signals, etc. The user is forced to compromise between the alternatives of either designing all or several of the components (or have someone do it for him) or selecting available components packaged in inferior packages.

The system of enclosures and connectors for microwave circuits disclosed herewith overcomes these problems.

SUMMARY OF THE INVENTION

This invention relates in general to enclosures for microwave circuits and means for interconnecting circuits mounted in these enclosures with each other or with microwave circuits or cables having conventional connectors.

It is an object of the invention to make it possible to manufacture a single circuit design that can be used alternatively in an assembly or as an individual circuit with connectors.

Another object of the proposed invention is to permit the interconnection of circuits so that the overall dimensions of the assembly are minimized.

Still another object of the invention is to achieve greater mechanical rigidity than when conventional connectors are used.

DESCRIPTION OF THE INVENTION

Figure 1:
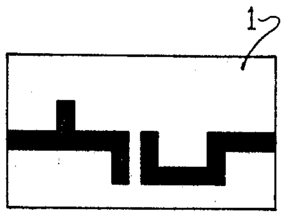
PRIOR ART Fig 1
FIGURE 1 shows a prior art microstrip circuit component.
Figure 2:
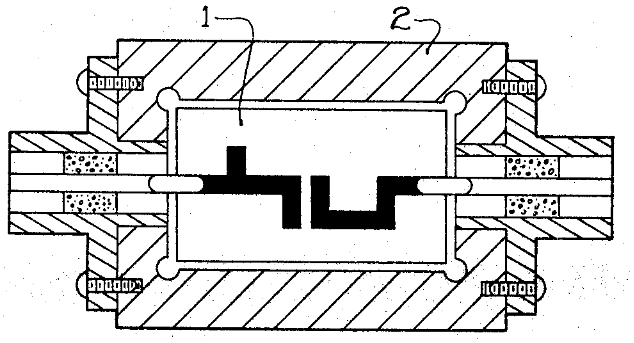
PRIOR ART Fig 2
FIGURE 2 shows said component mounted in a prior art enclosure.
Figure 3:
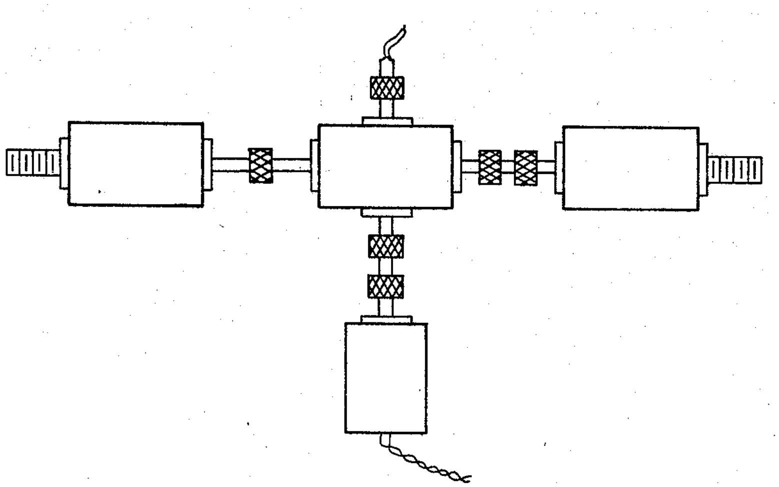
PRIOR ART Fig 3
FIGURE 3 shows plural prior art enclosures connected together.
Figures 4, 5:
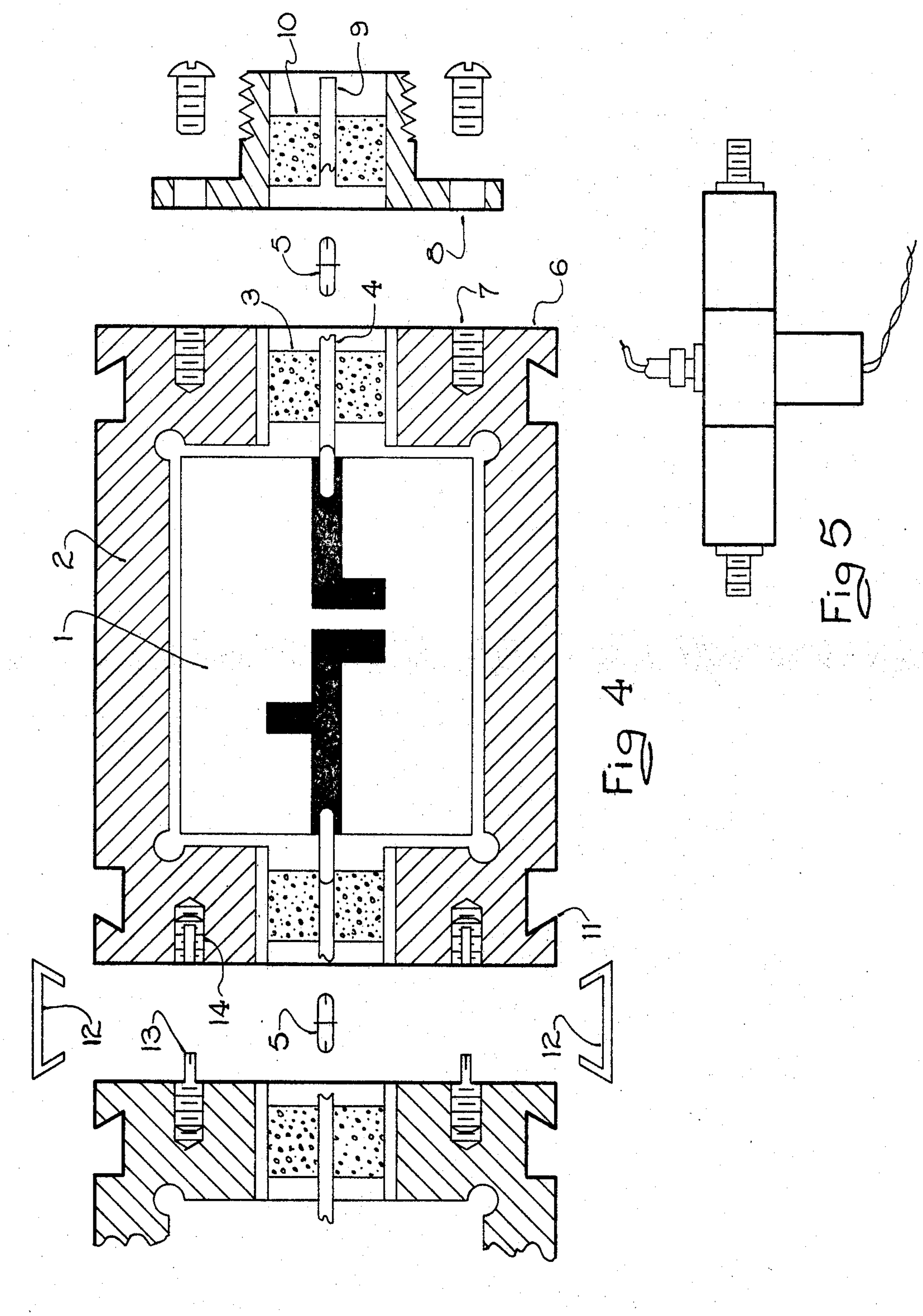
FIGURE 4 illustrates one embodiment of the structures in accordance with the invention.
FIGURE 5 illustrates an example of the relatively compact assembly that may be achieved with circuits enclosed in accordance with the invention.

Referring to FIGURE 4, microcircuit numbered 1 is mounted (for example, by soldering) in the box 2 shown in section. Coaxial means for introducing and removing high-frequency signals are installed in the box 2 in the form of insulating beads 3 and conductors 4. The most currently used transmission line, called unbalanced line, has just one center conductor 4 as shown in FIGURE 4. Other types of transmission lines have a plurality of conductors; for example, a balanced line has two conductors in addition to the surrounding shield.

Each center conductor is hollow for a sufficient depth on the external side to permit the insertion of a bullet 5. For carrying out the objectives of the invention, the ends of the center conductors 4 must be flush with the end faces 6 of the box or slightly recessed, unless a shim is employed to compensate for any protrusion.

A significant feaure of the invention is that alternative means of securing the box to adjacent structures are provided. In the example shown in FIGURE 4 tapped holes 7 are disposed so that the body of a connector attachment 8 can be bolted to the box. The bullet 5 is used to connect the center conductor 4 of the box with the center conductor 9 of the connector assembly. The center conductor of the connector is supported by a bead 10. The combined electrical reflections of beads 3 and 10 can be designed to compensate advantageously over selected frequency ranges.

Means consisting of slots 11 and clips 12 are provided for connecting two enclosures to each other with a minimum space requirement and with considerable more rigidity than obtained with ordinary connectors. To improve the rigidity and alignment, alignment pins 13 and sockets 14 can be provided. The clips 12 have spring tension so that the box can be clipped together quickly and securely for brassboard systems assembly.

(The term "brassboard" is used in microwave engineering to denote a prototype assembly composed of metal parts.)

Figure 6:
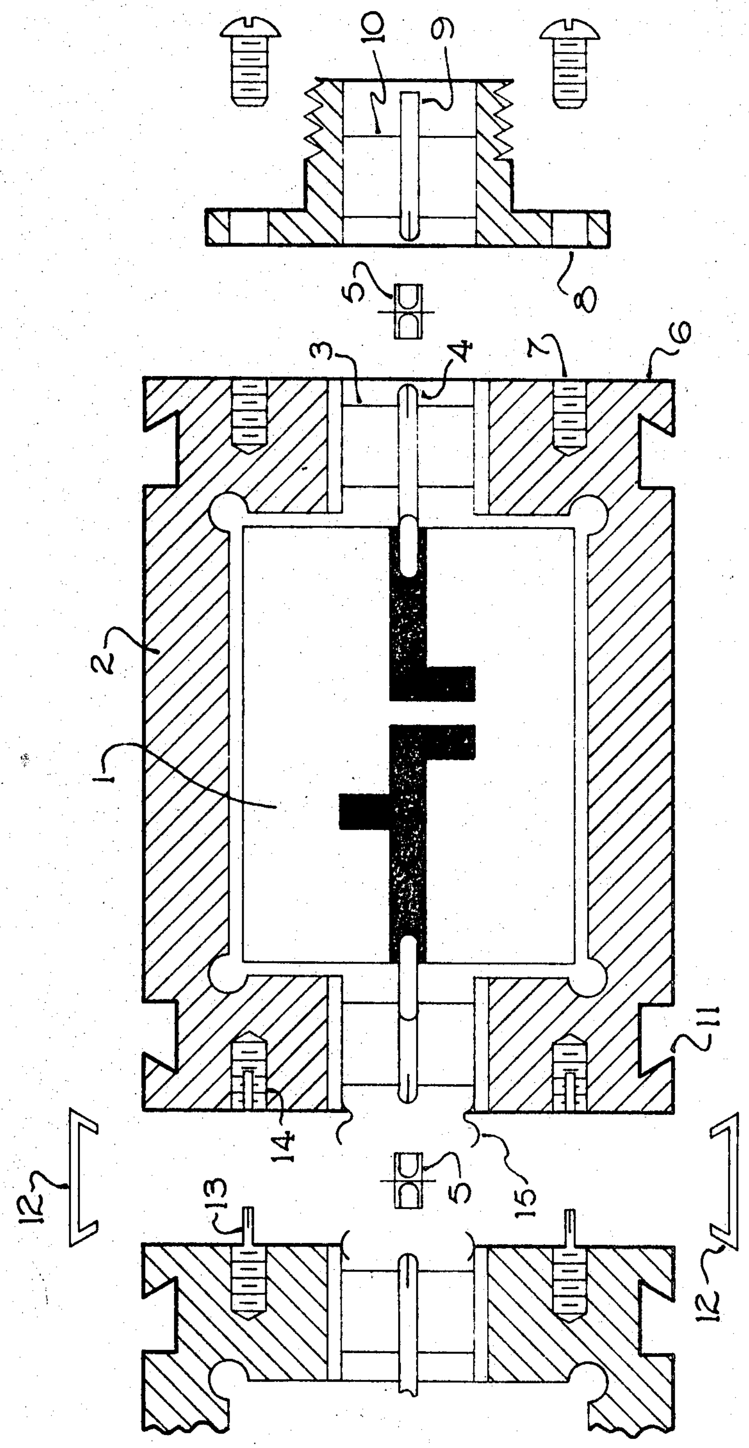
FIGURE 6 illustrates another embodiment of the structures in accordance with the invention.

Another embodiment of this invention is illustrated in FIGURE 6. Here the structures are nearly identical to FIGURE 4; however, in the coaxial means for introducing and removing high frequency signals the center conductor 4 is solid and is the male connection whereas the bullet 5 is hollow and is the female connection. Furthermore spring fingers 15 are attached to the outer conductor and extend beyond the surface of the box 2 so that they will mate with the outer conductor of other boxes or connectors when their surfaces are brought in aligned contact with each other. This arrangement is desirable for better matching, and to reduce fringing fields and possible arcing.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention.

What is claimed is:

1. An enclosure for a microwave circuit means comprising a housing enclosing a volume of space and having at least one aperture in a flat wall of said housing communicating from said volume of space to the exterior of said housing, coaxial line means in said aperture having a center conductor and an outer conductor for the introduction or removal of high frequency electromagnetic wave energy to and from said volume of space, one end of said coaxial line means terminating within the housing for electrical connection to the microwave circuit means when contained within the housing, the other end of said coaxial line means terminating within the plane of the outside surface of said wall of said housing, resilient conductive metal fingers attached to the outer conductor on one end and extending beyond the surface of the housing, and means other than said coaxial line means for holding said enclosure with said surface in abutting relation to an outside wall surface of a second entity fitted with means to connect said coaxial line means.

2. An enclosure for a microwave circuit means in cooperation with another similar enclosure which is a second entity comprising a housing enclosing a volume of space and having at least one aperture in a flat wall of said housing communicating from said volume of space to the exterior of said housing, coaxial line means in said aperture for the introduction or removal of high frequency electromagnetic wave energy to and from said volume of space, one end of said coaxial line means terminating within the housing for electrical connection to the microwave circuit means when contained within the housing, the other end of said coaxial line means terminating within the plane of the outside surface of said wall of said housing, and holding means other than said coaxial line means for holding said enclosure with said surface in abutting relation to an outside wall surface of the second entity fitted with means to connect to said coaxial line means, said holding means holding respective walls thereof in alignment in one common plane.

3. An enclosure for a microwave circuit means according to claim 2 including interconnecting means traversing said common plane for electrically interconnecting the coaxial means of one enclosure to the coaxial means of the other enclosure.

4. An enclosure for a microwave circuit means according to claim 3 wherein each of the coaxial means has an open ended tubular conductive center conductor, and the interconnecting means comprises a separate cylindrical electrically conductive rod having tapered ends to fit at each end into one of said tubular conductive center conductors.

5. An enclosure for a microwave circuit means according to claim 3 wherein each coaxial means has a solid cylindrical conductive center conductor with a tapered end, and the interconnecting means comprises a tubular conductor open at its ends to receive in mating contact said center conductors.

6. An enclosure assembly for a microwave circuit means according to claim 2 wherein said holding means comprises one or more bifurcated clips having spring tension for engagement in grooves adjacent said respective walls so that the enclosures can be fastened together removably and securely.

7. An enclosure assembly according to claim 6 including alignment pins and sockets provided on the respective enclosures to facilitate alignment and provide improved rigidity of mating parts.

References Cited

UNITED STATES PATENTS

| | | | |
|---|---|---|---|
| 2,451,868 | 10/1948 | Quackenbush et al. | |
| 3,354,411 | 11/1967 | Selby | 333—97 X |

H. K. SAALBACH, Primary Examiner

P. L. GENSLER, Assistant Examiner

U.S. Cl. X.R.

174—52, 88; 333—97; 339—92, 137